Jan. 29, 1935.　　　　J. GANZ　　　　1,989,446

DRIVING BLOCK ARRANGEMENT FOR MOTOR VEHICLES

Filed May 2, 1933

A-B

Patented Jan. 29, 1935

1,989,446

UNITED STATES PATENT OFFICE 1,989,446

DRIVING BLOCK ARRANGEMENT FOR MOTOR VEHICLES

Joseph Ganz, Frankfort-on-the-Main, Germany

Application May 2, 1933, Serial No. 668,967
In Germany May 7, 1932

6 Claims. (Cl. 180—73)

In order to obtain smooth running of a vehicle on the road, the wheels are preferably suspended independently of one another on a rigid chassis. Each wheel then rolls without influencing or being influenced by the others and rests firmly on the surface of the road.

Moreover, in order to utilize to best advantage the available ground adhesion for guiding the vehicle, it is advisable to keep as low as possible the moment of inertia of the vehicle around the vertical axis.

For another reason it appears advisable to reduce the moment of inertia of the masses also around the transverse axis of the vehicle; every sprung multiple-axled vehicle has a tendency to carry out pitching and tossing movements which are the more difficult to control the greater the moment of inertia around the transverse axis is.

The conditions for a good road position and spring suspension are therefore, amongst other things, separately suspended wheels, a chassis frame rigid against bending and twisting, and low moment of inertia around the vertical and transverse axes.

The middle girder chassis frame has been found particularly advantageous for vehicles with independently suspended wheels. Unfortunately it was hitherto not possible to obtain low mass moments of inertia therewith without introducing imperfections. The moment of inertia, as is known, is the total of the products from individual masses and the square of their distance from the centre of gravity of the vehicle. Consequently, the masses must be brought as near as possible to the centre of gravity of the loaded vehicle and concentrated around the same. It is impossible, when employing the middle girder chassis which is otherwise so advantageous, to accommodate the engine clutch and gearing near the centre of gravity of the vehicle between the running axles, as this space is occupied by the axles connecting the chassis. The driving block may, however, be arranged above the frame support. This, however, results in an undesirably high centre of gravity; the driving block might be suspended under the frame. This, however, would means a raising of the frame which would then extend in an unsightly manner through the middle of the available space. Further the driving block might also be arranged laterally of the frame, providing there is sufficient available space. This, however, again results in a very unsymmetrical construction of the vehicle. The driving block might also be accommodated within the hollow frame. In this instance it has also been proposed to mount the whole aggregate in the interior of the hollow frame which is made sufficiently large for this purpose. This is, however, accompanied by the difficulty of access and is also open to the objection that the enormous frame hollow girder occupies a considerable amount of the available space. It is also not advantageous to suspend the driving block in a horizontal bifurcation of the middle girder frame owing to the fact that this frame thereby loses a portion of its torsional resistance. Moreover the available space is restricted by the arms of the frame bifurcation, and as a rule a raising of the floor and therefore of the centre of gravity of the vehicle is necessary and the articulation of the swinging stub axles is prevented.

Finally, it is also known to employ the whole driving block as a support for the middle girder and which is fitted between the axle carrying bodies and the frame girder. The last mentioned arrangement in the known constructions, especially in the case of connection with the pivot axles and the transverse spring suspension, is open to objection since it is necessary to dismantle the vehicle frame, and separate at least one of the driving axles from the frame girder in order to remove the engine or even individual transmission elements, such as the clutch, driving shafts and toothed wheels. The present invention relates to a driving block arrangement for motor vehicles with a middle girder frame and primarily with driving aggregate masses lying within the wheel track in which the above mentioned objections to the known constructions are entirely overcome and with which it is particularly also possible to dismantle the engine as a whole, for example by merely detaching a flange without affecting the connection between the middle girder and the supporting axles.

According to the invention the driving engine is removably fitted on one side of the vertical middle frame which is widened to form an eye or on its end portion constructed as a suitable hollow element. The vertical longitudinal walls of the frame end portion have recesses through which the driving shafts, situated transversely to the longitudinal axis of the vehicle, extend. These shafts transmit the work of the engine to the driving axle shafts through the intermediary of power transmitting elements. Thus, a portion of the middle girder frame, in which the driving elements are situated, preferably consists of an element rigid against torsion and bending and rigidly or detachably connected to the frame girder. This element is so rigid that, for example, it is also possible to fit an engine in transverse arrangement and a gearing on the other side of the axle in such a manner that these axles only slightly project in the front and rear thus enabling the mass moment of inertia to be kept low.

It is particularly advantageous in the above mentioned arrangement to construct the element itself as a driving block casing and to mount therein, for example, three parallel transverse shafts situated in the same or practically the same plane thereof so that one is co-axial with the driving shaft of the laterally removable driving engine and carries on its inner side the clutch, whereas another is connected to the driving wheels by articulated shafts. Thus, after the removal of the driving engine the clutch is easily accessible. Further, the transmission shafts and wheels can be easily removed and exchanged without dismantling the chassis.

In the above mentioned arrangement the clutch spring is preferably fitted in such a manner that it is situated on the outer end of the main shaft and transmits its force to the clutch plates through the intermediary of the connecting rod. On the other hand the clutch may evidently be arranged at the opposite end, although the above mentioned construction is generally the more advantageous.

It is also particularly advisable to construct the driving block in such a manner that all the bearings of the driving shafts are situated in a united portion of the driving block casing, preferably in such a manner that one bearing of each driving mechanism shaft is situated in a common longitudinal wall of the driving block casing.

The middle portion of the axle (pivotally mounted axle) mounted on the driving block casing may be advantageously constructed as a continuous hollow shaft in which the wheel driving shafts are hingedly mounted. Brakes may also be fitted on the hollow shaft. Further, it is advisable to mount the vehicle supporting springs on the element. Finally it is generally also advantageous to allow the one or other of the alternately engageable toothed wheel or sprocket wheel sets between the main and intermediate shaft to remain always in engagement.

In the accompanying figures of the drawing a driving block arrangement according to the invention is shown diagrammatically by way of example. The engine, clutch, driving gearing and wheel drive, and if necessary also the brakes, are combined in a driving block, which itself forms a portion of the middle frame and which, apart from the fact that the parts can be easily fitted and dismantled, is characterized by its small space requirement, favorable weight distribution, equally high degree of efficiency in all stages of transmission, rigidity, simplicity of fitting and construction, and light weight, which is attainable in spite of great strength and lack of delicacy.

Figure 1:
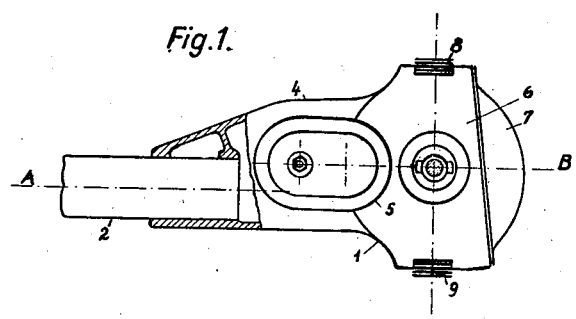
Fig. 1 shows this driving block in side elevation.
Figure 2:
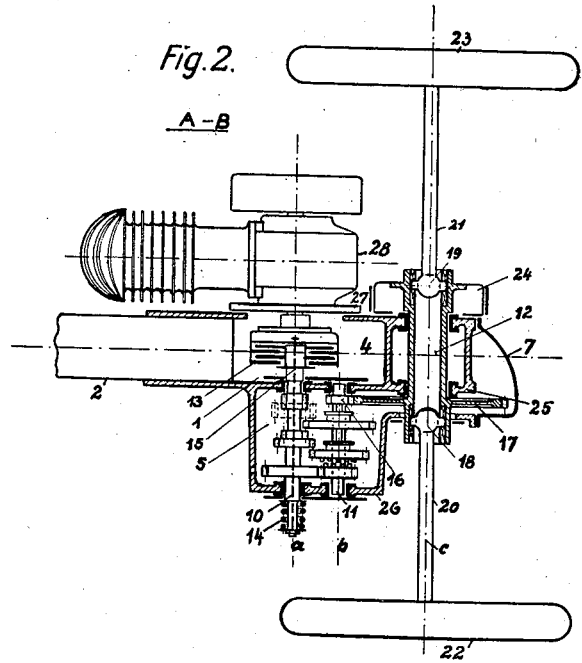
Fig. 2 is a longitudinal section on line A—B of Fig. 1.

The casing 1 forms the supporting element for uniting the vehicle middle girder frame 2 with the axle middle part 12.

The casing consists of a very rigid, box-shaped element 4 which forms the actual rigid supporting body, of lateral gear and driving wheel cases 5 and 6. 7 is the protecting cover. 8 and 9 are sets of springs mounted on the casing and shown in section. These springs, in the example illustrated, form the supporting elements for the driving wheels. The casing has three parallel bores $a$, $b$ and $c$.

The main shaft 10 is mounted in the bore $a$.

An intermediate shaft 11 is arranged in the bore $b$. Several intermediate shafts, adapted to be alternately employed, may be provided.

The bore $c$ accommodates the axle middle part 12 of the driving wheels. The driving shaft 10 carries on its inner side a coupling 13, the adhesion pressure of which is preferably produced by an outer spring 14 and is transmitted to the clutch plates by means of a connecting rod 15.

A driving engine 28 is fixed by flanges on the driving block casing co-axial with the main shaft 10 and forms the counter weight for the gearing.

The power transmission is effected from the engine 28 by the clutch 13 to the main shaft 10 and hence to the intermediate shaft 11 by alternately engageable pairs of spur or bevel wheels.

The intermediate shaft drives the driving gear 17 through the intermediary of a pinion 16 and this driving gear transmits the movement to the axle middle part 12 (with or without differential) and, through the intermediary of joints 18, 19 or the like, to the wheel driving shafts 20, 21 and the driving wheels 22, 23. Brake 24 may be mounted on the hollow shaft 12.

The driving block casing 1 need not be subdivided on its supporting parts. The parallel bores $a$, $b$ and $c$ are arranged in the continuous wall 25 and also in the wall 26 of the gear casing. Therefore all conditions for a continuous, perfect co-operation of the transmitting elements are fulfilled without adjustment.

It is possible to effect the transmission in any ratio of transmission through the intermediary of only two perfectly mounted driving elements. As the clutch has a certain elasticity, the main shaft 10 cannot jam in its bearings. As the clutch rotates at the same speed as the engine, it may be small and light.

The engine can be removed from the casing 1 after detaching the flange 27 or the like, whereupon the clutch is freely accessible. The gear shafts can be slipped out laterally. The lateral arrangement of the engine above indicated is characterized by its freedom from vibration because the free forces are resiliently absorbed to a certain extent by the frame.

I claim:—

1. A driving block arrangement for a motor vehicle with a middle girder frame, comprising in combination with the middle girder, a casing formed on one end of said girder, a driving engine detachably mounted at one side of said casing, a driving mechanism with transverse driving mechanism shafts accommodated in said casing, and a clutch connecting said engine to said transverse shafts, the transverse driving mechanism shafts extending through the vertical longitudinal walls of the casing, said casing and driving mechanism being arranged on the opposite side of said middle girder to said engine and forming a balanced relation therewith relative to said middle girder.

2. A driving block arrangement as specified in claim 1 comprising in combination with the engine, the driving block casing and the transverse driving mechanism shafts, said shafts being parallel to one another and lying substantially in the same plane, one of said shafts being co-axial with said engine, said clutch being on the inner side of this shaft, articulated shafts connected to another of said shafts and driving wheels carried by said articulated shafts.

3. A driving block arrangement as specified in claim 1, comprising in combination with the transverse driving mechanism shafts and the driving mechanism casing, an element made in one piece with said casing, and lateral bearings for said transverse shafts arranged in said element.

4. A driving block arrangement as specified in claim 1, in which each of said transverse driving mechanism shafts is journalled in a common longitudinal wall of the driving mechanism casing.

5. A driving block arrangement as specified in claim 1, comprising in combination with the casing and the transverse shafts, one of said shafts being the driving shaft, said clutch being mounted on said driving shaft, a clutch spring on the outer end of said shaft, and a connecting rod adapted to transmit the force of said spring to the plates of said clutch.

6. A driving block arrangement as specified in claim 1, comprising in combination with the driving block casing, a hollow shaft carried by said casing and in driving relation to the transverse driving mechanism shafts forming an axle middle part, and driving wheel shafts hingedly connected to said hollow shaft.

JOSEPH GANZ.